United States Patent
Kato

(10) Patent No.: US 9,884,543 B2
(45) Date of Patent: Feb. 6, 2018

(54) AUTOMOBILE BACK-DOOR STRUCTURE

(71) Applicant: KABUSHIKI KAISHA TOYOTA JIDOSHOKKI, Kariya-shi, Aichi-ken (JP)

(72) Inventor: Junya Kato, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/504,034

(22) PCT Filed: Jul. 21, 2015

(86) PCT No.: PCT/JP2015/070658
§ 371 (c)(1),
(2) Date: Feb. 15, 2017

(87) PCT Pub. No.: WO2016/027605
PCT Pub. Date: Feb. 25, 2016

(65) Prior Publication Data
US 2017/0267086 A1    Sep. 21, 2017

(30) Foreign Application Priority Data
Aug. 19, 2014  (JP) .................. 2014-166395

(51) Int. Cl.
*B60J 5/10*     (2006.01)
*B60J 10/88*    (2016.01)
*B60J 1/18*     (2006.01)
*B60J 10/34*    (2016.01)
*B60J 10/70*    (2016.01)
*B60J 1/10*     (2006.01)
*B60R 13/00*    (2006.01)

(52) U.S. Cl.
CPC ............... *B60J 10/88* (2016.02); *B60J 1/10* (2013.01); *B60J 1/18* (2013.01); *B60J 5/101* (2013.01); *B60J 10/34* (2016.02); *B60J 10/70* (2016.02); *B60R 13/00* (2013.01)

(58) Field of Classification Search
CPC ... B60J 10/88; B60J 10/34; B60J 10/70; B60J 1/10; B60J 1/18; B60J 5/101; B60J 13/00
See application file for complete search history.

(56) References Cited

U.S. PATENT DOCUMENTS 4,932,710 A * 6/1990 Chen ................... B60J 1/2088
                                                          160/107

FOREIGN PATENT DOCUMENTS

DE    102004063515 A1 * 7/2006 ............. B60J 1/008
JP    62-163116 U       10/1987
JP    08-142665 A        6/1996
(Continued)

OTHER PUBLICATIONS

International Preliminary Report on Patentability issued from the International Bureau in counterpart International Application No. PCT/JP2015/070658.

*Primary Examiner* — Lori L Lyjak
(74) *Attorney, Agent, or Firm* — Sughrue Mion, PLLC

(57) ABSTRACT

A back door structure for an automobile is provided with a back door frame including a window frame, a window located at a vehicle outer side of the window frame, and a blind including a cover that covers a gap between the window and the window frame. The blind joins the window with the back door frame.

6 Claims, 4 Drawing Sheets

(56) References Cited

FOREIGN PATENT DOCUMENTS

| | | |
|---|---|---|
| JP | 2005-088733 A | 4/2005 |
| JP | 2013-018346 A | 1/2013 |

* cited by examiner

AUTOMOBILE BACK-DOOR STRUCTURE

CROSS REFERENCE TO RELATED APPLICATIONS

This is a National Stage of International Application No. PCT/JP2015/070658 filed Jul. 21, 2015, claiming priority based on Japanese Patent Application No. 2014-166395 filed Aug. 19, 2014, the contents of all of which are incorporated herein by reference in their entirety.

TECHNICAL FIELD

The present invention relates to a back door structure for an automobile.

BACKGROUND ART

A prior art example of a back door structure for an automobile will now be described. FIG. 8 is a perspective view showing a rear portion of an automobile that includes a back door. FIG. 9 is a cross-sectional view taken along line IX-IX in FIG. 8. As shown in FIG. 8, the automobile 100 includes a back door 102 that is, for example, of an upward-swinging type. The back door 102 opens and closes a back door opening 105 of a vehicle body 104. As shown in FIG. 9, the back door 102 includes a back door frame 107, a back window 109, and a blind 111. The back door frame 107 includes a window frame 113. The window frame 113 includes an inner panel 114 and an outer panel 115. The inner panel 114 includes an inner edge and an outer edge, each including a flange 114a. In the same manner, the outer panel 115 includes an inner edge and an outer edge, each including a flange 115a. The two flanges 114a of the inner panel 114 are joined with the two flanges 115a of the outer panel 115. Thus, the window frame 113 is box-shaped and has a structure with a closed cross section.

The back window 109 is adhered by an adhesive 117 to a side wall of the window frame 113 that is located at the outer side of the vehicle (more specifically, side wall 115b of outer panel 115). The blind 111 is adhered to the back window 109 by, for example, a double-sided tape (not shown). The blind 111 includes a cover 121 that covers a gap 119 between the back window 109 and the window frame 113 (more specifically, flange 115a of outer panel 115). The blind 111 conceals the gap 119 so that the gap 119 is not exposed to the outside when the back door 102 is open. This improves the aesthetic appeal of the back door 102. The blind 111 is not joined with the flanges 115a of the outer panel 115. Further, the structure in which the back window is adhered to the window frame of the back door frame is described in, for example, patent document 1.

PRIOR ART DOCUMENT

Patent Document

Patent Document 1: Japanese Laid-Open Patent Publication No. 8-142665

SUMMARY OF THE INVENTION

Problems that are to be Solved by the Invention

In the prior art example, the back window 109 is joined with the window frame 113 of the back door frame 107. This limits the freedom of design for the arrangement of the back window 109. This is because of reasons (1) and (2), which will be described below.

(1) A weather strip (not shown) that is arranged in the back door opening 105 (refer to FIG. 8) of the vehicle body 104 limits the shape of the back door opening 105. For example, the weather strip includes a hollow portion that may be squeezed when the weather strip is bent at an acute angle. This may result in a sealing defect. To avoid such a sealing defect, the shape of the back door opening 105 is limited. This limits the shape of the back door frame 107 accordingly.

(2) The moldability of the outer panel 115 and the inner panel 114 limits the cross-sectional shape of the window frame 113 (refer to FIG. 9) in the back door frame 107. This limits the position where the back window 109 is adhered to the window frame 113.

Further, a vehicle body side member 123 that is adjacent to the back window 109 with a parting line located in between includes, for example, a quarter panel and a rear combination lamp. In general, as shown by the solid line in FIG. 9, to improve the aesthetic appeal of the automobile 100, the vehicle body side member 123 is continuous with the outer surface of the back window 109 without any step formed in between. However, for example, as shown by the broken line in FIG. 9, the design of the automobile 100 may require the vehicle body side member 123 to be greatly projected toward the rear of the automobile 100 (upper side in FIG. 9). In this case, the limitations imposed on the freedom of design for the arrangement of the back window 109 cause a step S to be formed between the back window 109 and the vehicle body side member 123. This may lower the aesthetic appeal of the automobile 100. In the structure in which the back window 109 is joined with the window frame 113 of the back door frame 107, it is difficult for the back window 109 to be continuous with the vehicle body side member 123 without forming any step S. This limits the freedom of design of the automobile 100.

It is an object of the present invention to provide a back door structure for an automobile that improves the freedom of design for the arrangement of a window.

MEANS FOR SOLVING THE PROBLEM

A back door structure for an automobile that solves the above problem includes a back door frame including a window frame, a window located at a vehicle outer side of the window frame, and a blind including a cover that covers a gap between the window and the window frame. The blind joins the window with the back door frame.

EMBODIMENTS OF THE INVENTION

Embodiments of the present invention will now be described with reference to the drawings.

[First Embodiment]

Figure 1:
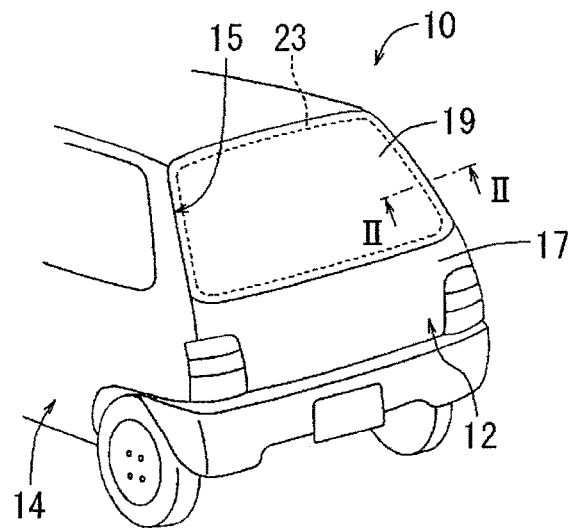
FIG. 1 is a perspective view showing a rear portion of an automobile including a first embodiment of a back door.
Figure 2:
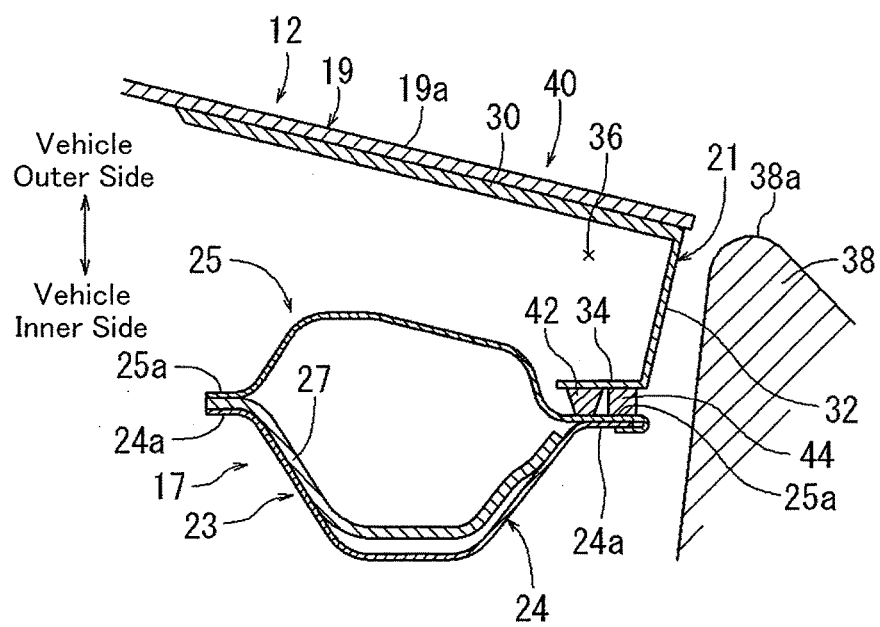
FIG. 2 is a cross-sectional view taken along line II-II in FIG. 1.

A first embodiment will now be described. FIG. 1 is a perspective view showing a rear portion of an automobile 10 that includes a back door 12. FIG. 2 is a cross-sectional view taken along line II-II in FIG. 1. As shown in FIG. 1, the automobile 10 includes the back door 12 that is, for example, of an upward-swinging type. The back door 12 opens and closes a back door opening 15 of a vehicle body 14. As shown in FIG. 2, the back door 12 includes a back door frame 17, a back window 19, and a blind 21. The back door frame 17 includes a window frame 23. The window frame 23 includes an inner panel 24 and an outer panel 25. The inner panel 24 includes an inner edge and an outer edge, each including a flange 24a. In the same manner, the outer panel 25 includes an inner edge and an outer edge, each including a flange 25a. The two flanges 24a of the inner panel 24 are joined with the two flanges 25a of the outer panel 25. Thus, the window frame 23 is box-shaped and has a structure with a closed cross section.

The main portion of the inner panel 24 has a U-shaped cross section. The main portion of the outer panel 25 has a reverse U-shaped cross section. The joined portions of the two flanges 24a of the inner panel 24 and the two flanges 25a of the outer panel 25 are located at a middle portion of the window frame 23 in the inward-outward direction of the automobile 10. In other words, the flanges 24a and 25a are located at a middle portion in the thickness-wise direction of the window frame 23. Further, a reinforcement 27 is arranged along the inner panel 24 in the closed cross section of the window frame 23. The inner end (left end in FIG. 2) of the reinforcement 27 is located between the flange 24a at the inner edge of the inner panel 24 and the flange 25a at the inner edge of the outer panel 25. The back door frame 17 and a weather strip (not shown) of the present embodiment are the same as, for example, those of the prior art example.

The back window 19 is located at the vehicle outer side of the window frame 23 of the back door frame 17. The back window 19 is arranged to seal a window opening that is defined by the window frame 23. The back window 19 is not joined with the window frame 23. The back window 19 includes a resin panel formed from a transparent resin such as polycarbonate resin and acrylic resin.

The blind 21 is formed integrally with a peripheral region of the back window 19 so that the blind 21 is located at the passenger compartment side of the back window 19. The blind 21 is formed from a colored resin that is opaque (including translucent), for example, a black polycarbonate resin including glass fibers and carbon black. The blind 21 includes a base 30, a cover 32, and a joined portion 34. The base 30 is arranged in a laminated manner over the entire periphery of the peripheral region of a vehicle inner side surface of the back window 19. The base 30 blackens the peripheral region of the back window 19. The peripheral surface of the base 30 is flush with or substantially flush with the peripheral surface of the back window 19.

The cover 32 is arranged to cover the outer end of a gap 36 between the back window 19 and the window frame 23 (more specifically, flange 25a at outer edge of outer panel 25). The cover 32 includes a linear cross section that extends from the outer end of the base 30 toward the outer end of the flange 25a at the outer edge of the outer panel 25. That is, the cover 32 extends between a peripheral edge of the back window 19 and a peripheral edge of the window frame 23. The width of the cover 32, that is, the dimension between the base 30 and the joined portion 34, is adjusted and set so that there are no steps or practically no steps between the back window 19 (more specifically, outer surface 19a) and a vehicle body side member 38 (more specifically, outer end surface or outer end 38a that is adjacent to outer surface 19a of back window 19 with parting line located in between). The gap 36 between the back window 19 and the window frame 23 (more specifically, flange 25a at outer edge of outer panel 25) varies in the longitudinal direction of the cover 32 (direction orthogonal to plane of FIG. 2). The width of the cover 32 varies in the longitudinal direction of the cover 32 as the gap 36 varies. Further, the joined portion 34 extends in a flanged manner from a distal edge of the cover 32 toward the inner edge of the window frame 23 (left side in FIG. 2). The joined portion 34 corresponds to the flange 25a at the outer edge of the outer panel 25.

The back window 19 and the blind 21 form a back window module 40 that is an integrally molded product. The back window module 40 is formed through two-color molding. In the two-color molding, for example, the back window 19 is formed by injection-molding a transparent resin, and the blind 21 is formed by injection-molding a colored resin so that the blind 21 contacts the back window 19.

The back window module 40 is attached to the back door frame 17 by adhering, or joining, the joined portion 34 of the blind 21 with the outer flange 25a at the outer end of the outer panel 25 in the window frame 23 with an adhesive 42 when the back window 19 is located at the vehicle outer side of the window frame 23. Thus, the blind 21 conceals the gap 36 so that the gap 36 is not exposed to the outside when the back door 12 is open. This improves the aesthetic appeal of the back door 12. Further, a dam 44, which is formed from, for example, a foaming agent, is arranged at the outer side of the adhesive 42 between the joined portion 34 and the flange 25a to prevent spreading of the adhesive 42.

In the vehicle back door structure, the blind 21 joins the back window 19 with the back door frame 17. This improves the freedom of design for the arrangement of the back window 19 even when design limitations are imposed on the arrangement of the back window 19. Consequently, the freedom of design of the automobile 10 is improved.

More specifically, for example, the design of the automobile 10 may require the vehicle body side member 38 to be greatly projected toward the outer side of the vehicle from the window frame 23 (refer to FIG. 2). In this case, the width of the cover 32 of the blind 21 (dimension between base 30 and joined portion 34) needs to be set so that there are no steps or practically no steps between the back window 19 and the vehicle body side member 38. Thus, the back window 19 (more specifically, outer surface 19a) is flush with the vehicle body side member 38 (more specifically, outer end surface or outer end 38a) even when the same back door frame and weather strip (not shown) as the prior art example are used. Accordingly, the aesthetic appeal of the automobile 10 is improved. This allows the position of the back window 19 to be adjusted even when design limitations are imposed on the arrangement of the back window of the prior art example. This improves the freedom of design for the arrangement of the back window 19. Consequently, the freedom of design of the automobile 10 is improved.

The back window 19 and the blind 21 are integrally formed. Thus, there is no need to form the back window 19 as a component separate from the back window 19. This reduces the number of components and the number of coupling operations of the back door 12 and thus reduces costs.

The cover 32 of the blind 21 is arranged to cover the outer end of the gap 36. This allows the cover 32 to conceal the gap 36 so that the gap 36 is not exposed to the outside when the back door 12 is open.

The blind 21 is integrated with the back window 19. The blind 21 includes the joined portion 34 that is continuous with the cover 32 and joined with the window frame 23 (more specifically, flange 25a of outer panel 25). This allows the blind 21 to be easily joined with the window frame 23 of the back door frame 17. Further, the cover 32 of the blind 21 is continuous with the joined portion 34 that is joined with the window frame 23. This limits movement of the cover 32 that is caused by vibration or the like.

The joined portion 34 of the blind 21 is joined with the flange (more specifically, flange 25a at outer edge of outer panel 25) of the window frame 23. This improves the aesthetic appeal of the peripheral portion of the blind 21.

[Second Embodiment]

Figure 3:
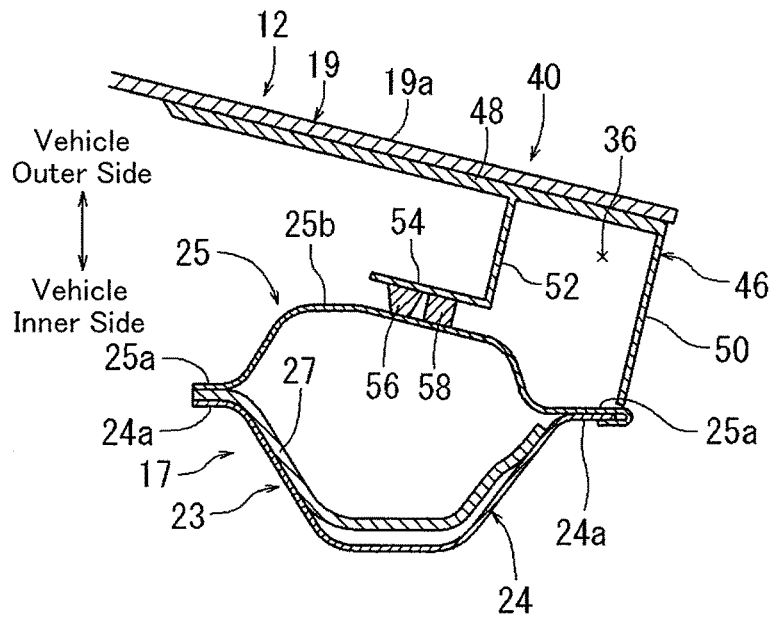
FIG. 3 is a cross-sectional view showing a second embodiment of a back door structure.

A second embodiment will now be described. In this embodiment and the subsequent embodiments, changes are added to the first embodiment. Thus, the changes will be described and elements that have already been described will not be described. FIG. 3 is a cross-sectional view showing the structure of the back door 12. As shown in FIG. 3, the second embodiment includes a blind 46 that includes a base 48, a cover 50, a connection portion 52, and a joined portion 54. The base 48 and the cover 50 are formed in the same manner as the base 30 and the cover 32 of the first embodiment (refer to FIG. 2). In the second embodiment, the joined portion 34 of the first embodiment (refer to FIG. 2) is omitted.

The connection portion 52 includes a linear cross section that extends from a middle portion of the base 48 in the inward-outward direction (sideward direction in FIG. 3) toward the side wall of the window frame 23 that is located at the outer side of the vehicle (more specifically, side wall 25b of outer panel 25). The connection portion 52 is parallel to the cover 50. Further, the joined portion 54 extends in a flanged manner from a distal edge of the connection portion 52 toward the inner side (left side in FIG. 3). The joined portion 54 is adhered to, that is, joined with, the side wall 25b of the outer panel 25 by an adhesive 56. A dam 58, which is formed from, for example, a foaming agent, is arranged between the joined portion 54 and the side wall 25b toward the outer side of the window frame 23 from the adhesive 56 to prevent spreading of the adhesive 56.

[Third Embodiment]

Figure 4:
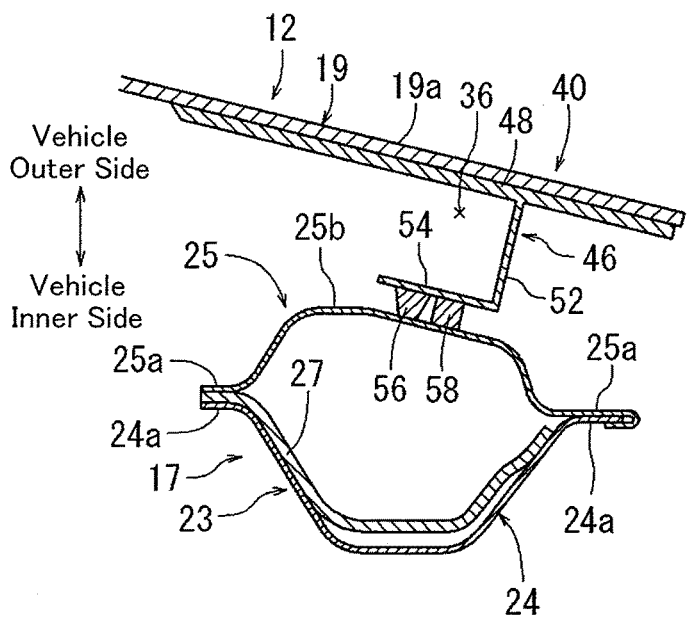
FIG. 4 is a cross-sectional view showing a third embodiment of a back door structure.

A third embodiment will now be described. FIG. 4 is a cross-sectional view showing the structure of the back door 12. As shown in FIG. 4, the present embodiment does not include the cover 50 of the blind 46 of the second embodiment (refer to FIG. 3). The connection portion 52 functions as a cover.

[Fourth Embodiment]

Figure 5:
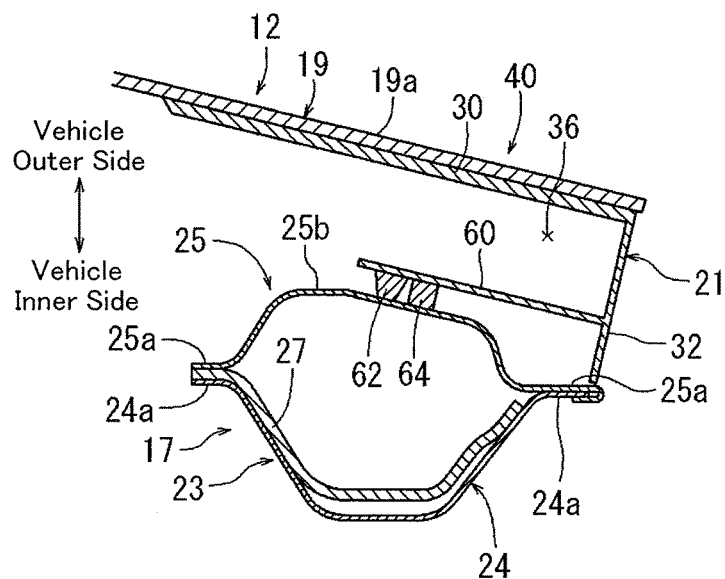
FIG. 5 is a cross-sectional view showing a fourth embodiment of a back door structure.

A fourth embodiment will now be described. FIG. 5 is a cross-sectional view showing the structure of the back door 12. As shown in FIG. 5, the present embodiment includes a joined portion 60 instead of the joined portion 34 of the blind 21 of the first embodiment (refer to FIG. 2). The joined portion 60 extends in a flanged manner from a middle portion of the cover 32 in the widthwise direction (vertical direction in FIG. 3) toward the inner side (left side in FIG. 3). The joined portion 60 is adhered to, that is, joined with, the side wall 25b of the outer panel 25 by an adhesive 62. A dam 64, which is formed from, for example, a foaming agent, is arranged between the joined portion 60 and the side wall 25b toward the outer side of the window frame 23 from the adhesive 62 to prevent spreading of the adhesive 62.

[Fifth Embodiment]

Figure 6:
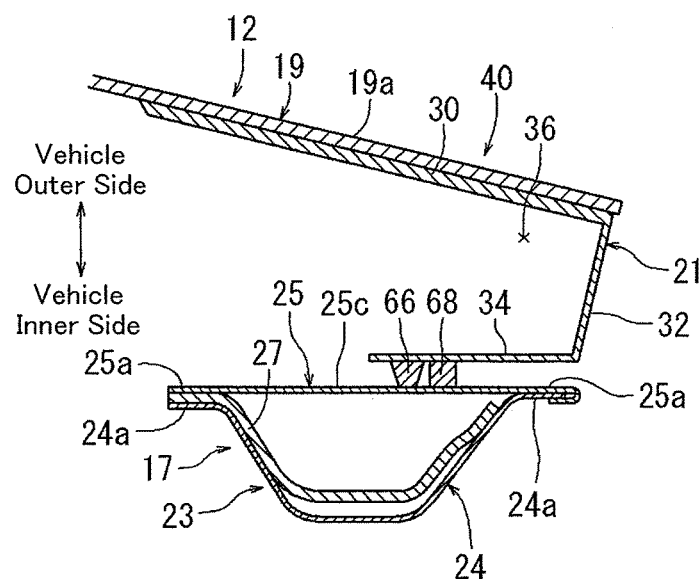
FIG. 6 is a cross-sectional view showing a fifth embodiment of a back door structure.

A fifth embodiment will now be described. FIG. 6 is a cross-sectional view showing the structure of the back door 12. As shown in FIG. 6, the present embodiment includes a flat outer panel 25 of the window frame 23 of the first embodiment (refer to FIG. 2). Further, the joined portion 34 of the blind 21 extends to the inner side (left side in FIG. 6). The joined portion 34 is adhered to, that is, joined with, a side wall 25c of the outer panel 25 by an adhesive 66. A dam 68, which is formed from, for example, a foaming agent, is arranged between the joined portion 34 and the side wall 25c of the outer panel 25 toward the outer side of the window frame 23 from the adhesive 66 to prevent spreading of the adhesive 66.

[Sixth Embodiment]

Figure 7:
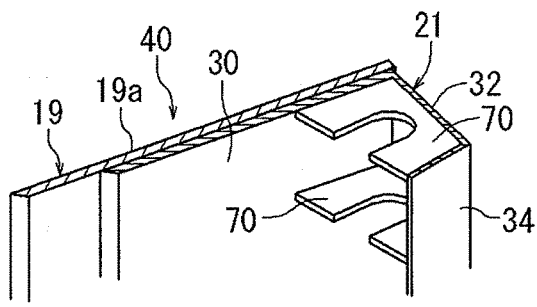
FIG. 7 is a cross-sectional view showing a sixth embodiment of a back window module.
Figure 8:
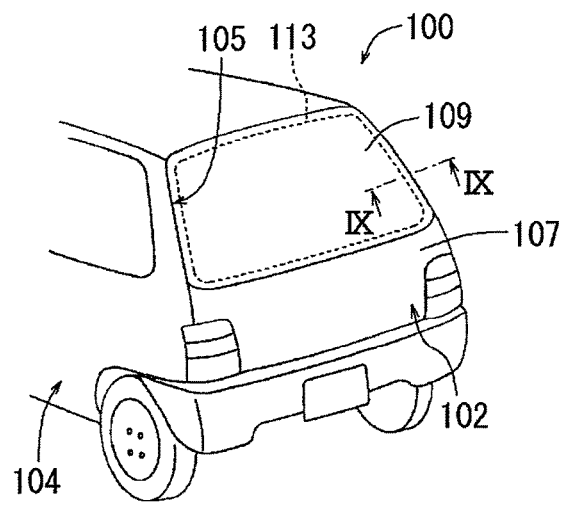
FIG. 8 is a perspective view showing a rear portion of an automobile including a prior art example of a back door.
Figure 9:
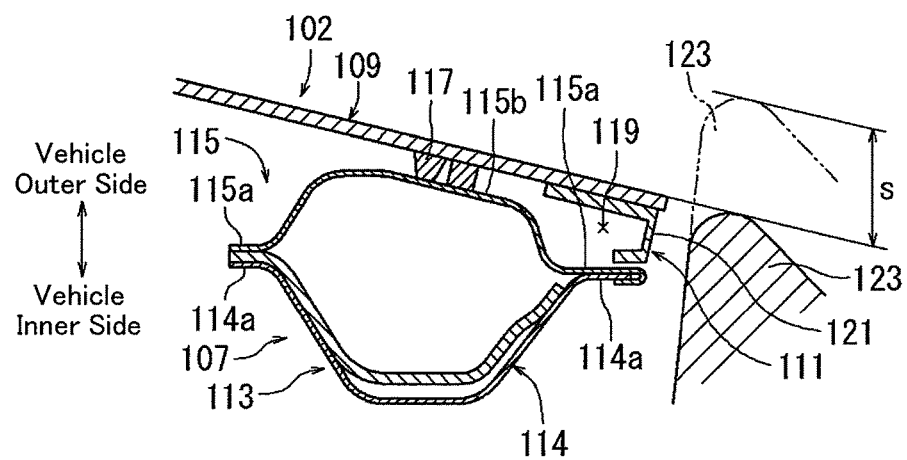
FIG. 9 is a cross-sectional view taken along line IX-IX in FIG. 8.

A sixth embodiment will now be described. FIG. 7 is a cross-sectional view showing the back window module 40. As shown in FIG. 7, the present embodiment includes a plurality of reinforcement ribs 70 that reinforce the cover 32. The reinforcement ribs 70 are arranged in the blind 21 of the first embodiment. Each reinforcement rib 70 is U-shaped and connected to the base 30, the cover 32, and the joined portion 34. That is, each reinforcement rib 70 is arranged between the cover 32, the base 30, and the joined portion 34. The reinforcement ribs 70 are arranged at a predetermined interval. This allows the reinforcement ribs 70 to reinforce the cover 32. Further, the reinforcement ribs 70 may be arranged between the cover 32 and the base 30 or between the cover 32 and the joined portion 34.

[Further Embodiments]

The present invention is not limited to the above embodiment and may be modified within the scope and equivalence of the appended claims. For example, the present invention is not limited to the back door 12 that is of an upward-swinging type and may be applied to a sideward-opening back door. Further, the present invention may be applied to a window that is arranged in parallel to the back window 19 of the back door 12, for example, an extra window. That is, the present invention is applicable to various types of back doors and various types of windows of a back door. In addition, in each of the above embodiments, the back window 19 is flush with the vehicle body side member 38. However, a step may be provided in accordance with the design of the automobile 10. A step between the back window 19 and the vehicle body side member 38 may be formed so that the vehicle body side member 38 projects from the back window 19 or may be formed so that the back window 19 projects from the vehicle body side member 38. The step between the back window 19 and the vehicle body side member 38 may be formed on at least part of adjacent portions. The back window 19 may be a glass panel instead of a resin panel. The blinds 21 and 46 do not have to be black. Further, the blinds 21 and 46 may be integrated with the back door frame 17 and joined with the back window 19.

In the second embodiment (refer to FIG. 3), the reinforcement ribs 70 of FIG. 7 may be arranged between the cover 50 and at least one of the base 48 and the connection portion 52 or between the connection portion 52 and at least one of the base 48 and the joined portion 54. In the third embodiment (refer to FIG. 4), the reinforcement ribs 70 of FIG. 7 may be arranged between the connection portion 52 (cover) and at least one of the base 48 and the joined portion 54. In the fourth embodiment (refer to FIG. 5), the reinforcement ribs 70 of FIG. 7 may be arranged between a basal region of the cover 32 (portion of cover 32 between section where joined portion 60 extends and outer end of base 30) and at least one of the base 30 and the joined portion 60 or between a distal region of the cover 32 (portion of cover 32 extending beyond section where joined portion 60 extends) and the joined portion 60. In the fifth embodiment (refer to FIG. 6), the reinforcement ribs 70 of FIG. 7 may be arranged between the cover 32 of the blind 21 and at least one of the base 30 and the joined portion 34.

The invention claimed is:

1. A back door structure for an automobile, the back door structure comprising:
    a back door frame including a window frame;
    a window spaced apart by a gap from the window frame toward a vehicle outer side of the window frame;
    a blind including a cover that covers the gap between the window and the window frame; and
    a vehicle body side member including an outer end surface or an outer end that is adjacent to an outer surface of the window with a parting line located in between, wherein
    the blind joins the window with the back door frame, and
    the cover is arranged to cover an outer end of the gap and extended in a vehicle inward-outward direction so that there is no step between the outer surface of the window and the outer end surface or the outer end of the vehicle body side member.

2. The back door structure according to claim 1, wherein the cover extends between a peripheral edge of the window and a peripheral edge of the window frame.

3. The back door structure according to claim 1, wherein the blind is integrated with the window, and
    the blind includes a joined portion that is continuous with the cover and joined with the window frame.

4. The back door structure according to claim 3, wherein the window frame includes a flange, and
    the joined portion is joined with the flange.

5. The back door structure according to claim 1, wherein the blind is joined with the window frame toward an inner side of the window frame from the cover.

6. The back door structure according to claim 1, wherein the blind includes a reinforcement rib that reinforces the cover.

* * * * *